United States Patent Office 2,870,208
Patented Jan. 20, 1959

2,870,208

UNSATURATED CYCLIC KETONES

Waldemar Guex, Bottmingen, Basel-Land, and Gottlieb Ryser, Basel, Switzerland, assignors to Hoffmann-La Roche Inc., Nutley, N. J., a corporation of New Jersey Application September 12, 1956, Serial No. 609,360

Claims priority, application Switzerland September 22, 1955

3 Claims. (Cl. 260—586)

This invention relates to novel chemical processes and products.

In one of its comprehensive embodiments, the invention relates to a process which comprises heating a mixture of an ester having the formula (I)
$$R^2-CH_2-\overset{O}{\underset{\|}{C}}-\overset{R^1}{\underset{|}{CH}}-\overset{O}{\underset{\|}{C}}-O-R$$

wherein R represents a lower alkyl radical, $R^1$ represents a member selected from the group consisting of hydrogen and lower acyclic hydrocarbon radicals, and $R^2$ represents a member selected from the group consisting of hydrogen and hydrocarbon radicals having less than seven carbon atoms; and a carbinol having the formula (II)
$$CH_3-\underset{\underset{CH_2R^3}{|}}{C}=CH-\underset{\underset{R^3}{|}}{CH}-\underset{\underset{R^3}{|}}{CH}-\underset{\underset{CH_3}{|}}{\overset{OH}{C}}-C\equiv CH$$

wherein $R^3$ represents a member selected from the group consisting of hydrogen and lower acyclic hydrocarbon radicals; said carbinol being employed in at least about 10 percent molar excess in proportion to said ester; at a temperature sufficiently high to eliminate carbon dioxide from the reaction mixture; and separating from the reaction mixture a cyclic ketone having the formula (III)
$$\begin{array}{c} CH_3 \diagup CHR^3 \\ \diagdown C \nearrow \\ R^3-C\underset{5}{-}\underset{4}{-}\underset{3}{-}\underset{2}{-}C-CH_2-\overset{R^1}{\underset{|}{CH}}-\overset{O}{\underset{\|}{C}}-CH_2-R^2 \\ R^3-\underset{\diagdown H \diagup}{CH} \quad \underset{\|}{C}-CH_3 \\ \underset{|}{C} \\ R^3 \end{array}$$

wherein $R^1$, $R^2$ and $R^3$ have the same meaning indicated above.

In another of its comprehensive embodiments, the invention relates to certain novel cyclic ketones obtainable by the process described above. These ketones can be represented by the formula (IV)
$$\begin{array}{c} CH_3 \diagup CHR^3 \\ \diagdown C \nearrow \\ R^3-C\underset{}{-}\underset{}{-}C-CH_2-\overset{R^1}{\underset{|}{CH}}-\overset{O}{\underset{\|}{C}}-CH_3 \\ R^3-\underset{\diagdown H \diagup}{CH} \quad \underset{\|}{C}-CH_3 \\ \underset{|}{C} \\ R^3 \end{array}$$

wherein $R^1$ represents a lower acyclic hydrocarbon radical, and $R^3$ represents a member selected from the group consisting of hydrogen and lower acyclic hydrocarbon radicals.

They are useful as odorants in the preparation of perfumes and similar scented compositions.

In still another of its comprehensive embodiments, the invention relates to another class of cyclic ketones obtainable by the above described process. These ketones have the formula (V)
$$\begin{array}{c} CH_3 \diagup CHR^3 \\ \diagdown C \nearrow \\ R^3-C\underset{}{-}\underset{}{-}C-CH_2-CH_2-\overset{O}{\underset{\|}{C}}-CH_2-R^2 \\ R^3-\underset{\diagdown H \diagup}{CH} \quad \underset{\|}{C}-CH_3 \\ \underset{|}{C} \\ R^3 \end{array}$$

wherein $R^2$ represents a hydrocarbon radical having less than seven carbon atoms and $R^3$ represents a member selected from the group consisting of hydrogen and lower acyclic hydrocarbon radicals.

They, too, are useful as odorants in the preparation of perfumes and similar scented compositions.

In a preferred embodiment of the process aspect of the invention, the carbinol reactant is employed in at least about 30% molar excess in proportion to the ester reactant, preferably in the proportion of from about 1.3 mols to about 4 mols of carbinol reactant per mol of ester reactant; and the mixture of carbinol and ester is heated at a temperature higher than about 170° C., preferably at a temperature in a range from about 170° C. to about 190° C.

The reaction is advantageously effected by heating the mixture of ester and carbinol in a glass or enamelled reaction vessel. Volatile reaction products, comprising principally carbon dioxide and in certain instances (depending upon the specific identity of the radical R) a volatile alcohol of the formula ROH, wherein R has the same meaning indicated above, are permitted to escape from the reaction vessel through a gas meter. The completion of the reaction can be recognized by cessation of evolution of carbon dioxide. Upon completion of the reaction, the entire liquid reaction product is subjected to careful fractionation through an efficient column in order to separate the fraction containing the desired cyclic ketone product of Formula III above.

The invention is further disclosed in the following examples, which are illustrative but not limitative thereof. In the examples, temperatures are stated in degrees centigrade and pressures in millimeters of mercury.

Example 1

200 g. of 3,7-dimethyl-6-octen-1-yn-3-ol was mixed with 130 g. of ethyl acetoacetate and the mixture was heated at 170°–190° while stirring. Volatile reaction products, principally ethanol and carbon dioxide, were permitted to escape from the reaction mixture. At the end of about six hours, the evolution of carbon dioxide ceased (after liberation of about 20 liters of carbon dioxide, measured at NTP). The reaction mixture was then distilled in high vacuum through an efficient column. The fraction having a boiling range of 54°–56° (0.1 mm.) and having $n_D^{25}=1.4810$ comprised essentially 4-(2-methyl-5-isopropenyl-1-cyclopenten-1-yl)-2-butanone. This fraction weighed 75 grams. This compound had a pleasant fragrance reminiscent of violet.

Example 2

152 g. of 3,7-dimethyl-6-octen-1-yn-3-ol was mixed with 65 g. of ethyl acetoacetate. The mixture was heated at 170°–190°, while stirring, until the evolution of carbon dioxide ceased. Then the reaction mixture was fractionated in a high vacuum through an efficient column. The fraction having a boiling range of 54°–56° (0.1 mm.) and having $n_D^{25}=1.4810$ comprised essentially 4-(2-methyl-5-isopropenyl-1-cyclopenten-1-yl)-2-butanone. This fraction weighed 40 grams.

Example 3

200 g. of 3,6,7-trimethyl-6-octen-1-yn-3-ol was mixed with 130 g. of ethyl acetoacetate, and the mixture was heated at 170°–190° until there was no further evolution of carbon dioxide. Then the reaction mixture was fractionated in a high vacuum through an efficient column. The product, 4-(2,5-dimethyl-5-isopropenyl-1-cyclopenten-1-yl)-2-butanone, was recovered in the fraction having a boiling range of 58°–60° (0.1 mm.), $n_D^{25}=1.4810$. This compound had a pleasant fragrance reminiscent of orris.

Example 4

200 g. of 3,7-dimethyl-6-octen-1-yn-3-ol was mixed with 144 g. of ethyl α-methylacetoacetate. The mixture was heated at 170°–190°, while stirring, until the evolution of carbon dioxide ceased. The reaction mixture was then submitted to high vacuum fractional distillation through an efficient column. The fraction boiling at 58°–60° (0.1 mm.) and having $n_D^{25}=1.4815$ comprised essentially 3-methyl-4-(2-methyl - 5 - isopropenyl-1-cyclopenten-1-yl)-2-butanone. The fragrance of this compound was of an herb-like character, with a camphor-like note.

Example 5

304 g. of 3,7-dimethyl-6-octen-1-yn-3-ol was mixed with 65 g. of ethyl acetoacetate. The reaction mixture was heated at 180° until the evolution of carbon dioxide ceased. Then the reaction mixture was carefully fractionated in a high vacuum. The fraction having a boiling range of 54°–56° (0.1 mm.) and having $n_D^{25}=1.4810$ comprised essentially 4-(2-methyl-5-isopropenyl-1-cyclopenten-1-yl)-2-butanone. This fraction weighed 50 grams.

Example 6

152 g. of 3,7-dimethyl-6-octen-1-yn-3-ol was mixed with 72 g. of ethyl propionylacetate and the mixture was heated at 185°, while stirring, until the evolution of carbon dioxide ceased. The reaction mixture was then subjected to careful high vacuum fractionation, yielding 31 g. of 5-(2-methyl-5-isopropenyl-1-cyclopenten-1-yl)-3-pentanone, B. P. 56°–58° (0.05 mm.), $n_D^{25}=1.4790$. The fragrance of this compound was reminiscent of violet, with a camphor-like note.

Example 7

108 g. of 3,7-dimethyl-6-nonen-1-yn-3-ol was mixed with 65 g. of ethyl acetoacetate, and the mixture was heated at 180°, while stirring, until evolution of carbon dioxide ceased. The reaction mixture was then carefully fractionated in a high vacuum, yielding 30 g. of 4-(2-methyl - 5 - [2 - buten - 2 - yl] - 1 - cyclopenten - 1 - yl) - 2 - butanone, B. P. 67°–69° (0.3 mm.), $n_D^{24}=1.4825$. The fragrance of this compound was reminiscent of violet, with a peppery accent.

The starting material, 3,7-dimethyl-6-nonen-1-yn-3-ol, was prepared as follows:

600 g. of 3-methyl-1-penten-3-ol was cooled to 15° with an ice bath, then 1800 cc. of concentrated aqueous hydrochloric acid (containing 37% by weight HCl) was poured into the reaction vessel. The mixture was stirred for 30 minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph was added from a separatory funnel in 2 hours at 60°. The stirring was then continued at 60° overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 grams of potassium hydroxide. This was stirred for two hours, then allowed to stand overnight, thereby forming the potassium salt of 3-carboxy-6-methyl-5-octen-2-one.

Concentrated aqueous hydrochloric acid was added to the stirred reaction mixture from a separatory funnel until strongly acid. The oil layer was removed, and the aqueous portion was extracted with one liter of benzene. The combined oils were water washed and fractionated to yield 6-methyl-5-octen-2-one, distilling at 65° (10 mm.), $n_D^{25}=1.4412$.

84 g. of metallic sodium was dissolved in 3 liters of liquid ammonia. Acetylene was bubbled into the stirred solution until its color changed from blue to a white. 420 g. of 6-methyl-5-octen-2-one was dissolved in 500 cc. of diethyl ether and dropped into the stirred reaction mixture in one hour. Stirring was then continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was then water washed, dried over anhydrous calcium sulfate and fractionated to yield 3,7-dimethyl-6-nonen-1-yn-3-ol, distilling at 89° (10 mm.), $n_D^{25}=1.4612$.

Example 8

200 g. of 3,7-dimethyl-6-octen-1-yn-3-ol was mixed with 170 g. of ethyl-α-allyl-acetoacetate and the mixture was heated at 170°–190° while stirring, until the evolution of carbon dioxide ceased. The reaction mixture was then distilled in a high vacuum through an efficient column. 45 g. of 4-(2-methyl-5-isopropenyl-1-cyclopenten-1-yl)-3-allyl-2-butanone having a boiling point of 75° (0.1 mm.) and having $n_D^{20}=1.4869$ are so obtained.

Example 9

200 g. of 3,7-dimethyl-6-octen-1-yn-3-ol was mixed with 170 g. of β-cyclopropyl-β-oxo-propionic acid ethyl ester and the mixture was heated at 170°–190° while stirring, until the evolution of carbon dioxide ceased. The reaction mixture was then distilled in a high vacuum through an efficient column. 80 g. of 3-(2-methyl-5-isopropenyl - 1 - cyclopenten - 1 - yl) - 1 - cyclopropyl - 1 - propanone having a boiling point of 68° (0.05 mm.) and having $n_D^{20}=1.4967$ are so obtained.

Example 10

200 g. of 3,7-dimethyl-6-octen-1-yn-3-ol was mixed with 180 g. of ethyl benzoyl acetate and the mixture was heated at 170–190° while stirring, until the evolution of carbon dioxide ceased. The reaction mixture was then distilled in a high vacuum through an efficient column. 85 g. of 3-(2-methyl-5-isopropenyl-1-cyclopenten-1-yl)-1-phenyl-1-propanone having a boiling point of 97° (0.05 mm.) and having $n_D^{20}=1.5426$ are so obtained.

Example 11

200 g. of 3,7-dimethyl-6-octen-1-yn-3-ol was mixed with 170 g. of ethyl-3-oxo-6-heptenoate and the mixture was heated at 170°–190° while stirring, until the evolution of carbon dioxide ceased. Then the reaction mixture was fractionated in a high vacuum through an efficient column. 90 g. of 1-(2-methyl-5-isopropenyl-1-cyclopenten-1-yl)-6-hepten-3-one having a boiling point at 70° (0.05 mm.) and having $n_D^{20}=1.4900$ are so obtained.

Example 12

214 g. of 3,4,7-trimethyl-6-octen-1-yn-3-ol was mixed with 130 g. of ethyl acetoacetate. The mixture was then heated at 170°–190° until the evolution of carbon dioxide ceased. Then the reaction mixture was fractionated in a high vacuum through an efficient column. 78 g. of 4-(2,3-dimethyl-5-isopropenyl-1-cyclopenten-1-yl)-2-butanone having a boiling point of 50° (0.05 mm.) and having $n_D^{20}=1.4800$ are so obtained.

We claim:
1. 4 - (2 - methyl - 5 - isopropenyl - 1 - cyclopenten-1-yl)-2-butanone substituted solely by an allyl radical on a carbon atom adjacent the oxo group.
2. 1 - (2 - methyl - 5 - isopropenyl - 1 - cyclopenten-1-yl)-6-hepten-3-one.
3. 4 - (2 - methyl - 5 - isopropenyl - 1 - cyclopenten-1-yl)-3-allyl-2-butanone.

References Cited in the file of this patent

UNITED STATES PATENTS

| | | |
|---|---|---|
| 2,766,289 | Lacey | Oct. 9, 1956 |
| 2,799,706 | Kimel et al. | July 16, 1957 |